United States Patent [19]

Sun

[11] Patent Number: 6,099,448

[45] Date of Patent: Aug. 8, 2000

[54] KNIFE PICKING DEVICE AND KNIFE RECEIVING UNIT FOR A CUTTING CENTER MACHINE

[76] Inventor: Ho Wei Sun, No. 20, Allley 28, Lane 851, Chung Shan Road, Shen Kang Hsiang, Taichung Hsien, Taiwan

[21] Appl. No.: 09/383,219

[22] Filed: Aug. 26, 1999

[51] Int. Cl.$^7$ ................................................ B23Q 3/157
[52] U.S. Cl. .............................. 483/31; 483/38; 483/41; 483/43; 483/48
[58] Field of Search .................................. 483/48, 40, 43, 483/41, 38, 39, 22, 23, 27, 29, 37, 51, 54, 58, 59, 61, 63, 65, 69; 29/568; 211/1.5, 69

[56] References Cited

U.S. PATENT DOCUMENTS

| | | | |
|---|---|---|---|
| 4,132,318 | 1/1979 | Wang et al. | 414/591 |
| 4,274,192 | 6/1981 | Norimatsu | 29/568 |
| 4,428,109 | 1/1984 | Seeger | 29/568 |
| 5,093,978 | 3/1992 | Binder | 29/568 |
| 5,169,373 | 12/1992 | Horikawa | 29/568 |
| 5,876,316 | 3/1999 | Kato | 483/39 |

FOREIGN PATENT DOCUMENTS

| | | | |
|---|---|---|---|
| 3721610 | 1/1989 | Germany | 483/39 |
| 0106241 | 4/1990 | Japan | 483/40 |
| 1458145 | 2/1989 | U.S.S.R. | 483/40 |
| 1481025 | 5/1989 | U.S.S.R. | 483/40 |

Primary Examiner—Stephen F. Gerrity
Assistant Examiner—Adrian Wilson
Attorney, Agent, or Firm—Bacon & Thomas, PLLC

[57] ABSTRACT

A knife picking device includes a base member which is connected to a linear guide frame. The linear guide frame is movably connected to a linear guide board in two perpendicular directions. A block is connected to the base member and a cylindrical member movably and rotatably extends through the block. The cylindrical member has a spiral groove and a connection device actuated by a first cylinder is connected between the base member and the block. The connection device is engaged with the spiral groove and a second cylinder is connected to the cylindrical member. An arm activated by a third cylinder is connected to the base member and the linear guide frame. The second cylinder is moved to a desired position of a knife receiving unit by operating the first cylinder and the third cylinder.

7 Claims, 12 Drawing Sheets

KNIFE PICKING DEVICE AND KNIFE RECEIVING UNIT FOR A CUTTING CENTER MACHINE

FIELD OF THE INVENTION

The present invention relates to a knife picking device for accurately picking a knife in a knife receiving unit and returning a knife to the knife receiving unit of a cutting machine.

BACKGROUND OF THE INVENTION

A conventional knife changing system for cutting center machine employs a chain which has a plurality of sockets each of which receives a knife therein. The chain rotates about a center shaft so as to move a knife to be used to a desired position so that a knife picking device picks the knife and installs the knife to the engaging means on a driving shaft. Although 30 knifes can be connected to the chain for the use of the users, however, each knife is so heavy so that the chain needs a huge power to rotate it and the space needs a lot of space so that the chain and the knifes can be retained therein. If the chain travels a long distance, the position of the knifes relative to the chain could slightly change due to gravity, and it consumes energy. Of more importance is that when changing the knifes, the knife picking device has to wait for the chain and this takes time. For example, if the knife #30 is to be picked, then the chain has to rotate almost a complete circle to allow the knife #30 be shifted to the position where is suitable for the picking device to proceed the knife engaging process. If a job has to use 20 to 30 knifes, the time consumed in knifes changing is significant which will increase the cost of manufacturing.

The present invention intends to provide a knife picking device and a knife receiving unit, wherein the knife picking device can be moved along two axes which are perpendicular with each other so as to quickly arrive the position where the desired knife is located. Accordingly, the knife receiving unit may receive a lot of knifes within a small space and there will be not necessary to include a large transportation system to move or shift the knifes in the knife receiving unit.

The present invention has arisen to mitigate and obviate the disadvantages of the conventional knife picking device and the conventional knife receiving unit.

SUMMARY OF THE INVENTION

In accordance with one aspect of the present invention, there is provided a knife picking device and a knife receiving unit for a cutting center machine. The knife receiving unit is located beside the knife picking device which comprises a linear guide frame movably connected to a linear guide board. A base member is pivotally connected to the linear guide frame. A block is connected to the base member and a cylindrical member movably and rotatably extends through the block. The cylindrical member has a spiral groove defined in an outside thereof. A connection means is engaged with the spiral groove and is connected to a first cylinder. The cylindrical member has one end thereof connected to a second cylinder. An arm has the first end thereof connected to a third cylinder and the arm has the second end pivotally connected to the linear guide frame.

The primary object of the present invention is to provide a knife picking device for a cutting center machine wherein the knife picking device can be moved along two perpendicular directions so as to reach the knife position in the knife receiving unit in a short period of time.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
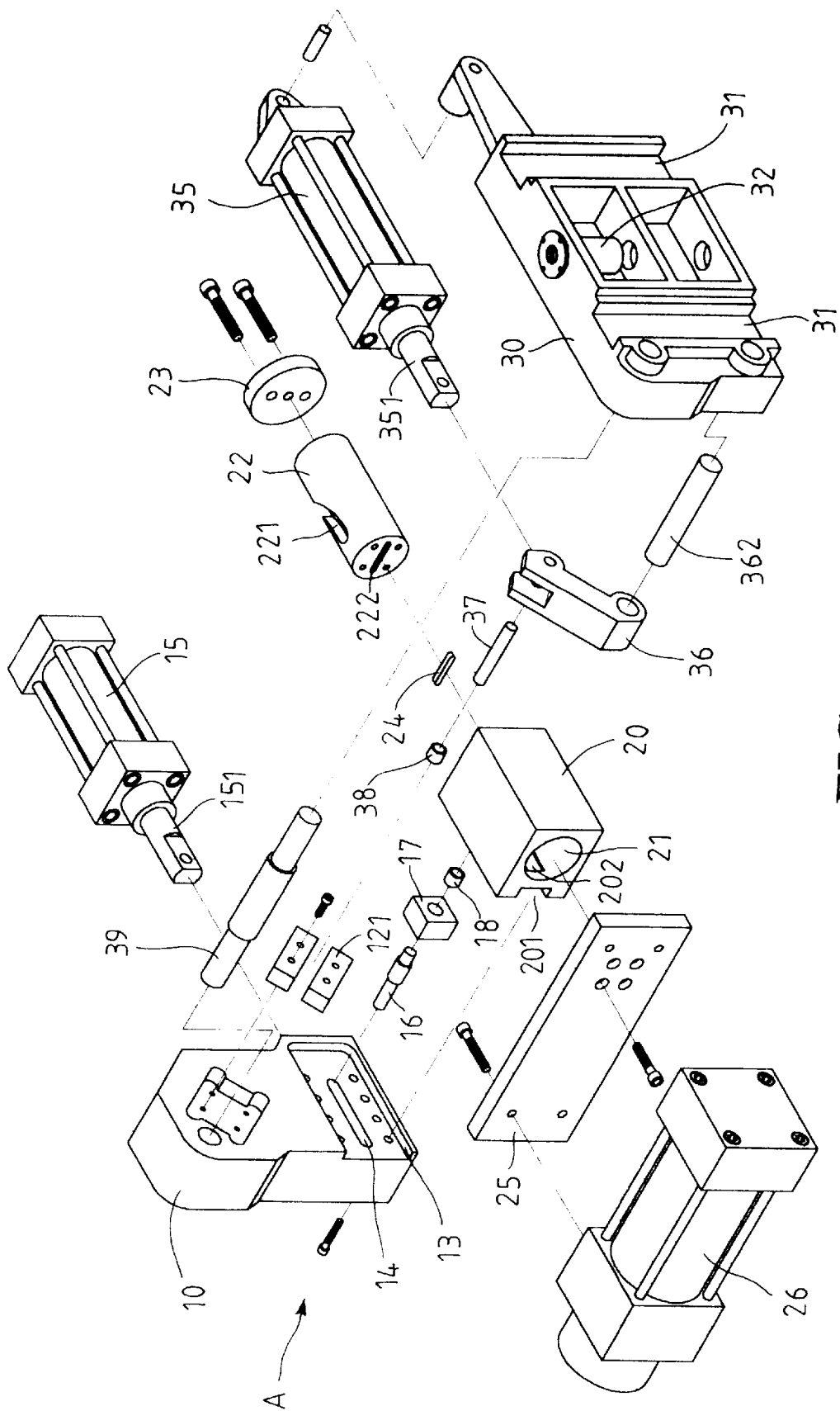
FIG. 1 is an exploded view of the knife picking device in accordance with the present invention.
Figure 2:
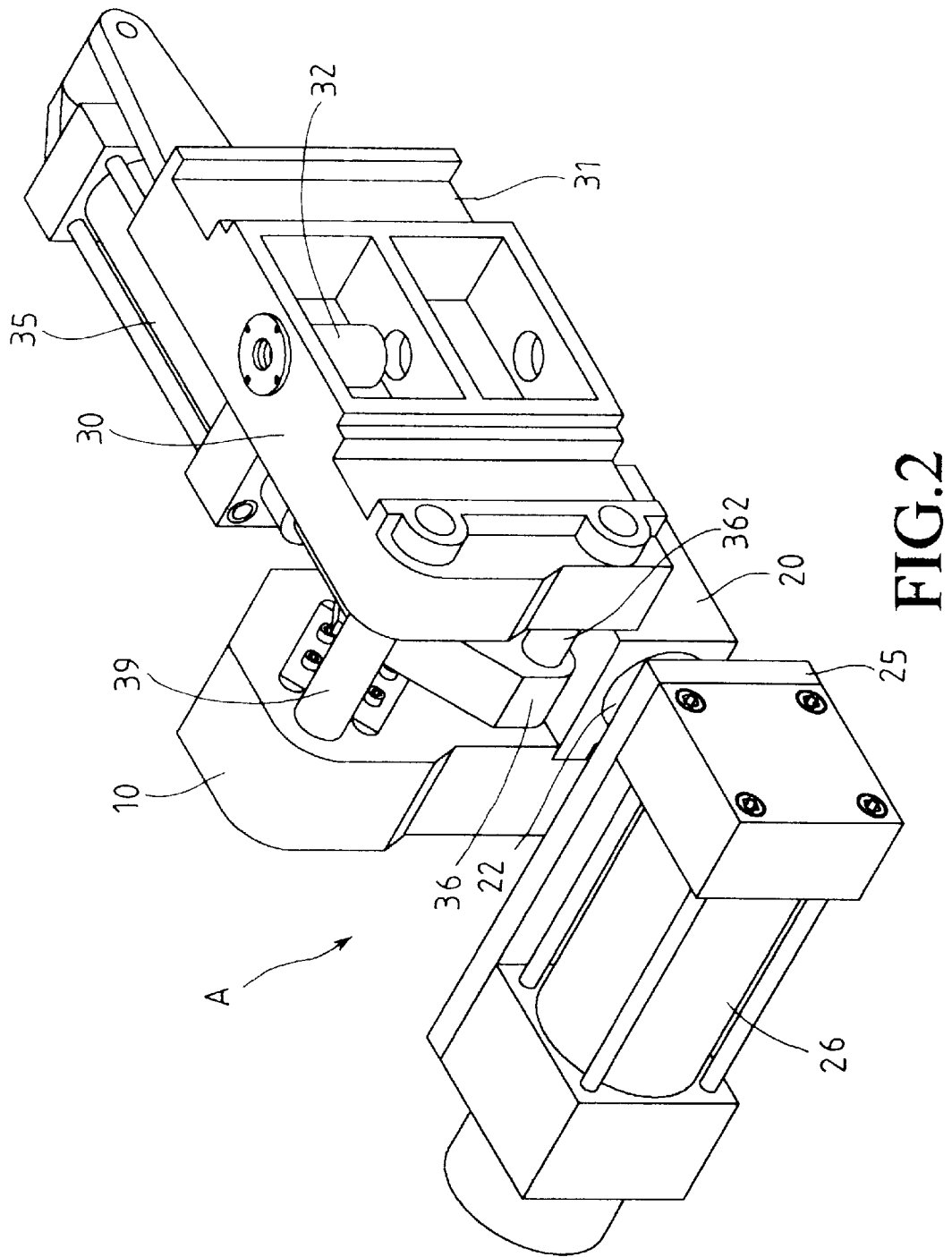
FIG. 2 is a perspective view of the knife picking device in accordance with the present invention.
Figure 3:
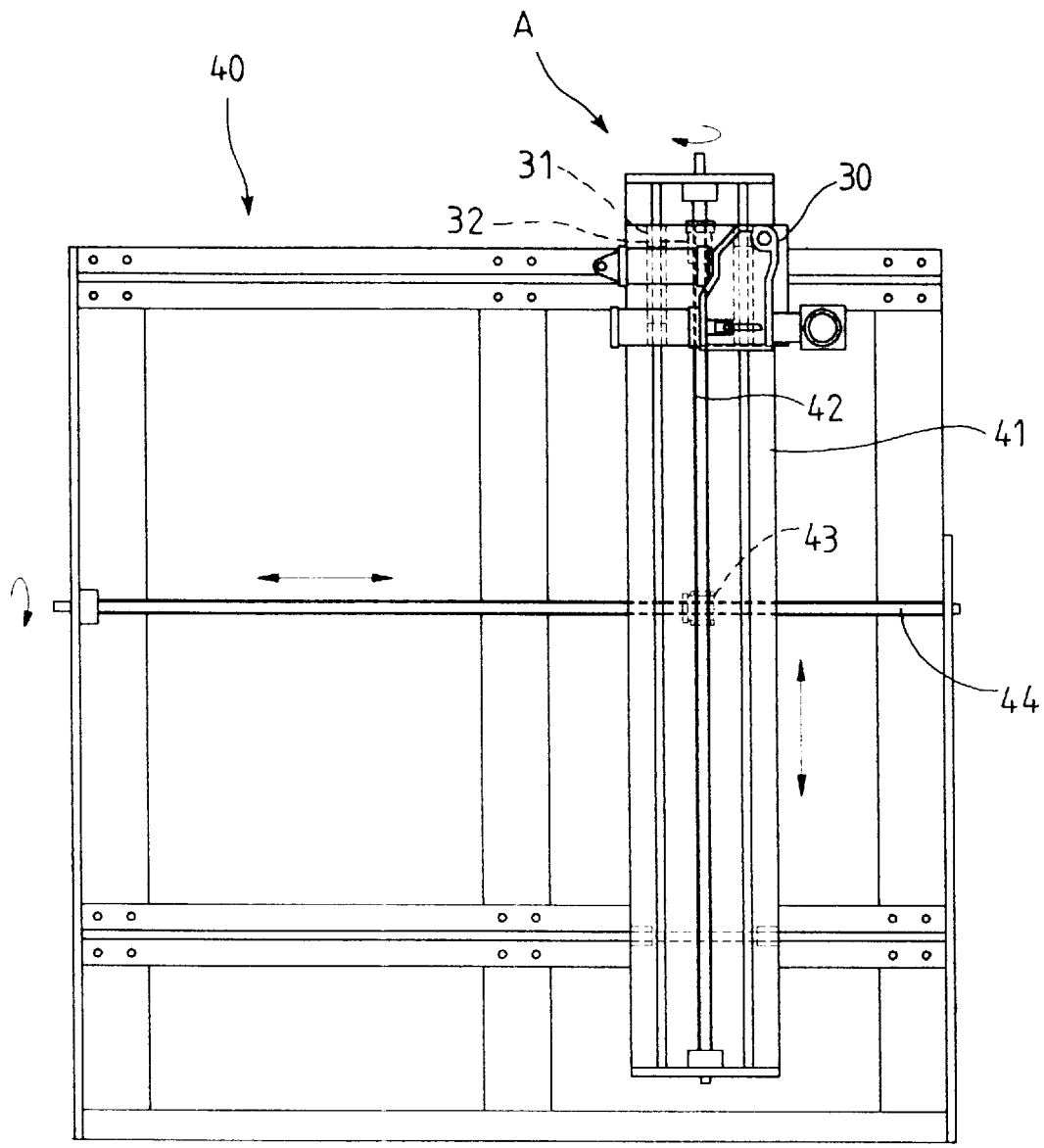
FIG. 3 is an illustrative view to show the knife picking device and the two ballscrews in the linear guide board.
Figure 4:
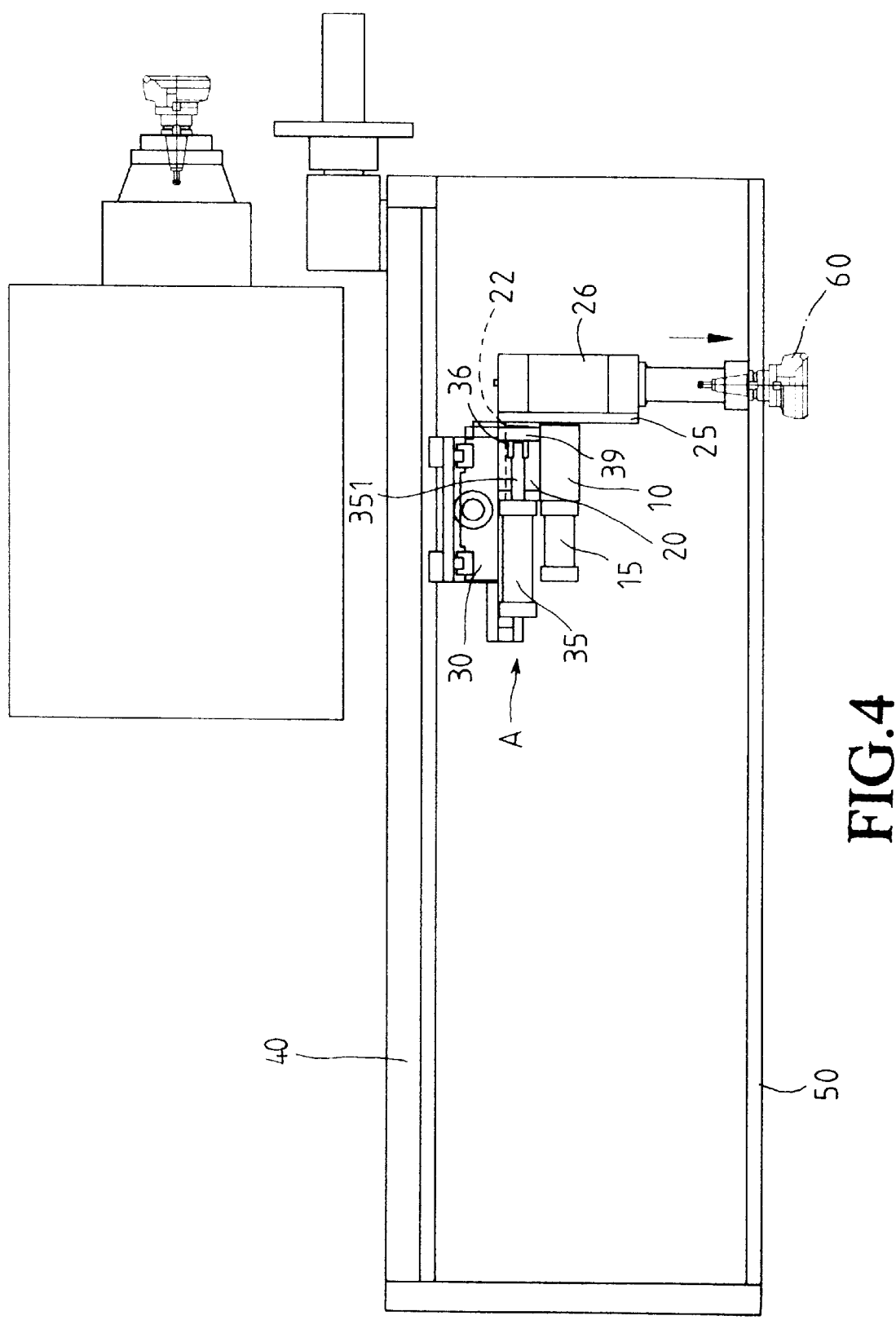
FIG. 4 is an illustrative view to show the knife picking device, the knife receiving unit, the knife engaging means and the driving shaft which is connected with one end of the knife engaging means.
Figure 5:
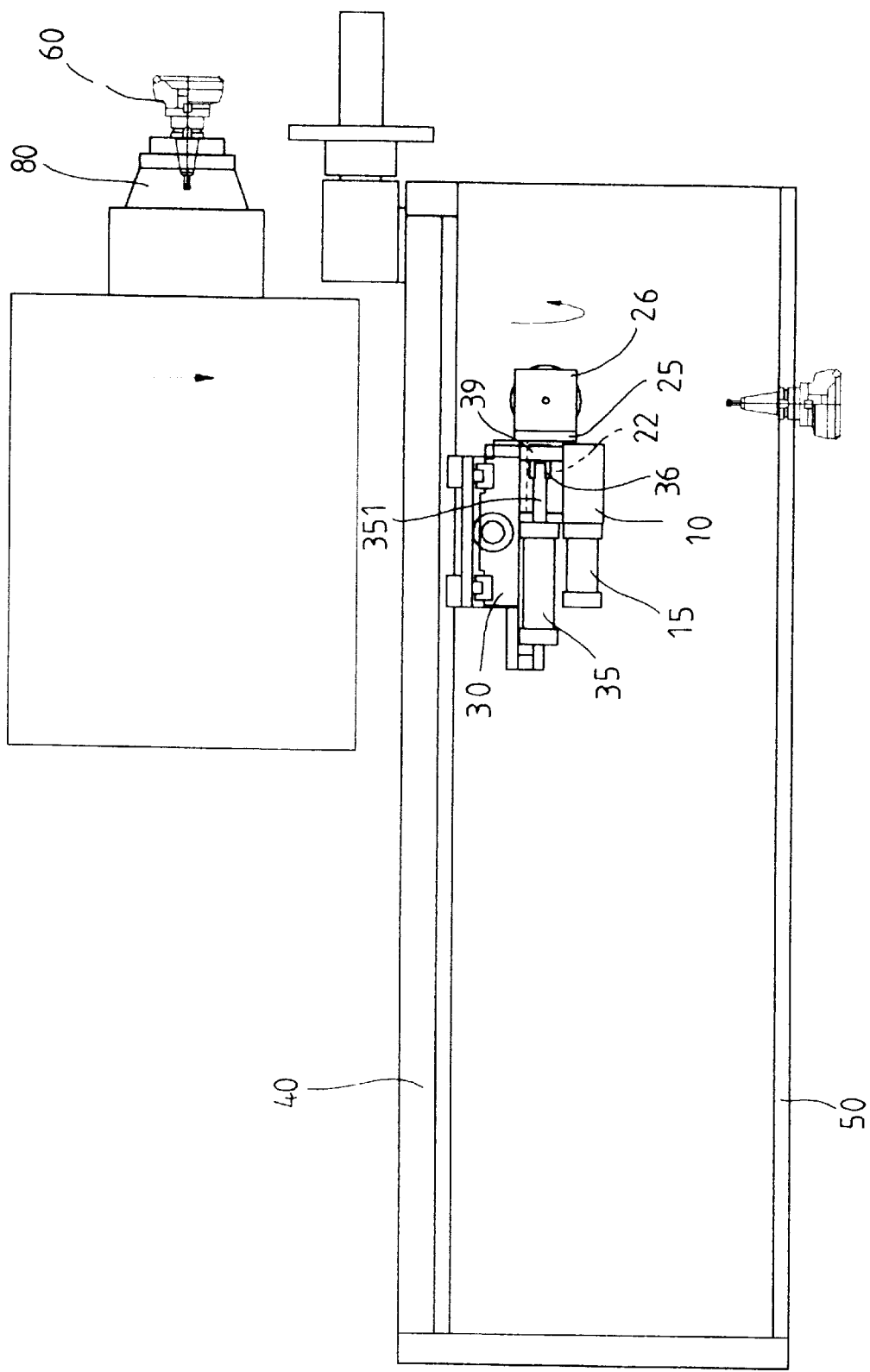
FIG. 5 is an illustrative view similar to that shown in FIG. 4, wherein the second cylinder is turned to another direction and rotates.

For a better understanding of the present invention, reference is made to FIGS. 1 to 4 illustrating the knife picking device "A" and a knife receiving unit 50 for a cutting center machine. The knife receiving unit 50 is located beside the knife picking device "A" so that the knife picking device "A" can conveniently pick knifes 60 received in the knife receiving unit 50. The knife picking device comprises a linear guide board 40 and a linear guide frame 30 movably connected to the linear guide board 40. The linear guide frame 30 has two notches 31 so as to engage with a moving board 41. A sleeve 32 is connected to the linear guide frame 30 and a first ballscrew 42 threadedly extends through the sleeve 32, the first ballscrew 42 is connected to a second ballscrew 44 by a ballscrew inter-connector 43, and the first ballscrew 42 and a second ballscrew 44 are perpendicular with each other so that the linear guide frame 30 together with the moving board 41 can be moved along the first ballscrew 42 and the second ballscrew 44. A base member 10 is pivotally connected to the linear guide frame 30 by a main pin 39. The base member 10 has a track composed of two parallel and inclined elongated members 121, and a pin 37a having a first end thereof connected to a roller 38 which is movably engaged between the two members 121. The base member 10 has a recessed area 13 and an elongated notch 14 is defined in a bottom defining the recessed area 13.

A block 20 is connected to the base member 10, a passage 21 defined through the block 20 and a slot 202 defined radially through the block 20, the passage 21 communicating with the slot 202. The block 20 has a recess 201 defined in a side thereof and the slot 202 communicates with the recess 201. The side having the recess 201 of the block 20 is received in the recessed area 13 of the base member 10 and the main pin 39 is located in opposite to the block 20. A cylindrical member 22 is movably and rotatably received in the passage 21 of the block 20, the cylindrical member 22 having a spiral groove 221 defined in an outside thereof. A connection means is engaged with the spiral groove 221 and extending through the slot 202. The connection means includes a pin 16 which extends through a sliding member 17 slidably received in the recess 201 of the block 20. One end of the pin 16 is engaged with the elongated notch 14 in the base member 10, and the second end of the pin 16 is connected to a roller 18 which is engaged with the spiral groove 221 in the cylindrical member 22. A first cylinder 15 has a first piston rod 151 which is connected to the pin 16. The cylindrical member 22 has one end thereof has a key-slot 222 and a board 25 is connected to the cylindrical member 22 by inserting a key 24 of the board 25 in the key-slot 222. An end cap 23 is connected to the block 20 to limit the other end of the cylindrical member 22 dropping from the block 20. A second cylinder 26 is connected to the board 25 and has a second piston rod.

An arm 36 has a first end thereof connected to a second end of the pin 37 and the arm 36 has a second end pivotally connected to the linear guide frame 30 by a pin 362. A third cylinder 35 has a third piston rod 351 which is connected to the first end of the arm 36.

The second cylinder 26 is actuated to let the second piston rod extend and then the first cylinder 15 is actuated to let the first piston rod 151 extend so that the sliding member 17 is moved in the recess 201 of the block 20. The cylindrical member 22 is moved by the motion of the sliding member 17 and rotates because the roller 18 moves in the spiral groove 221. This makes the second cylinder 26 rotates to engage a knife 60 in the knife receiving unit 50.

Figure 6:
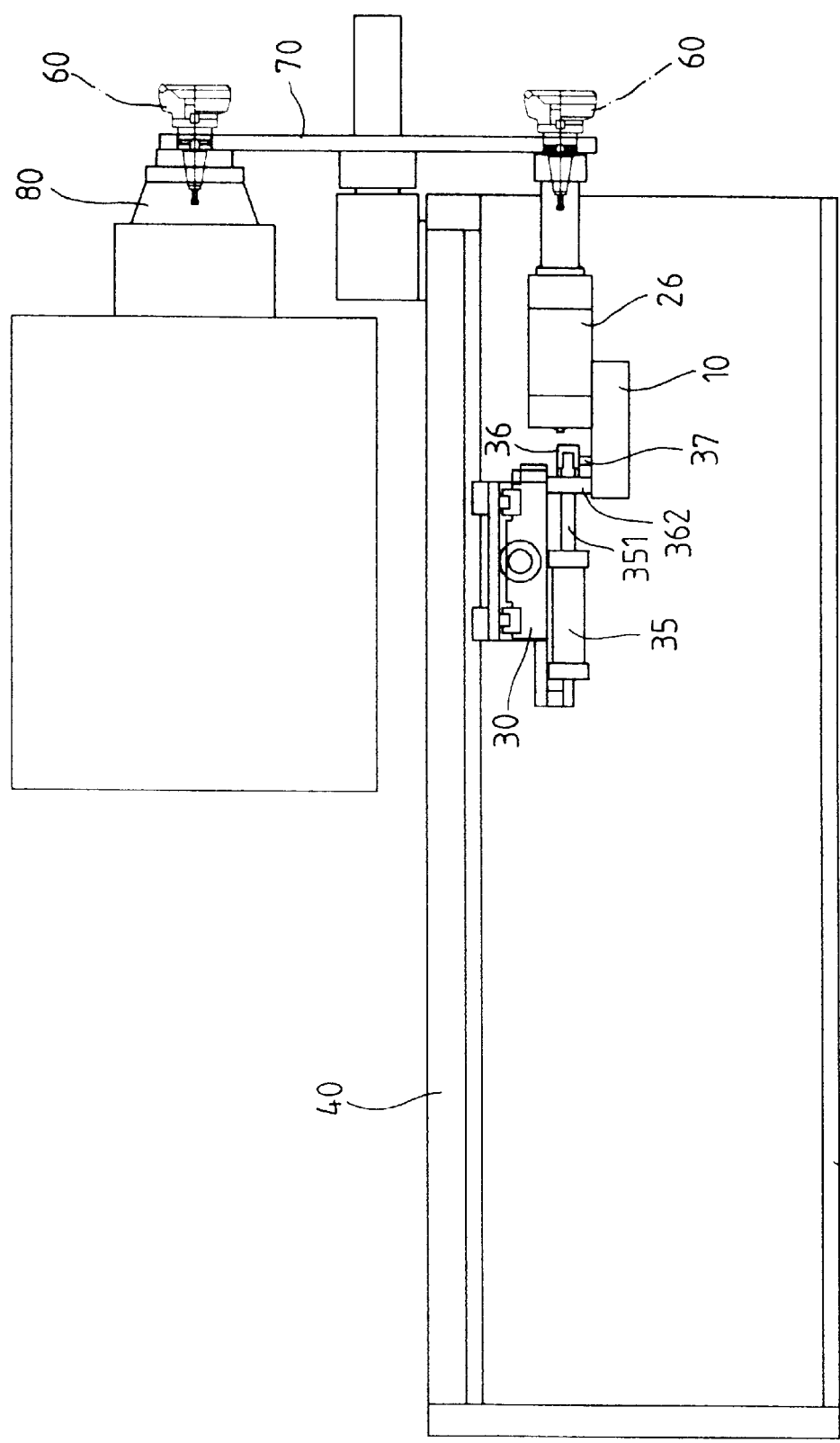
FIG. 6 is an illustrative view similar to that shown in FIG. 5, wherein the knife engaging means is engaged with two knifes respectively on the second cylinder and the driving shaft.
Figure 7:
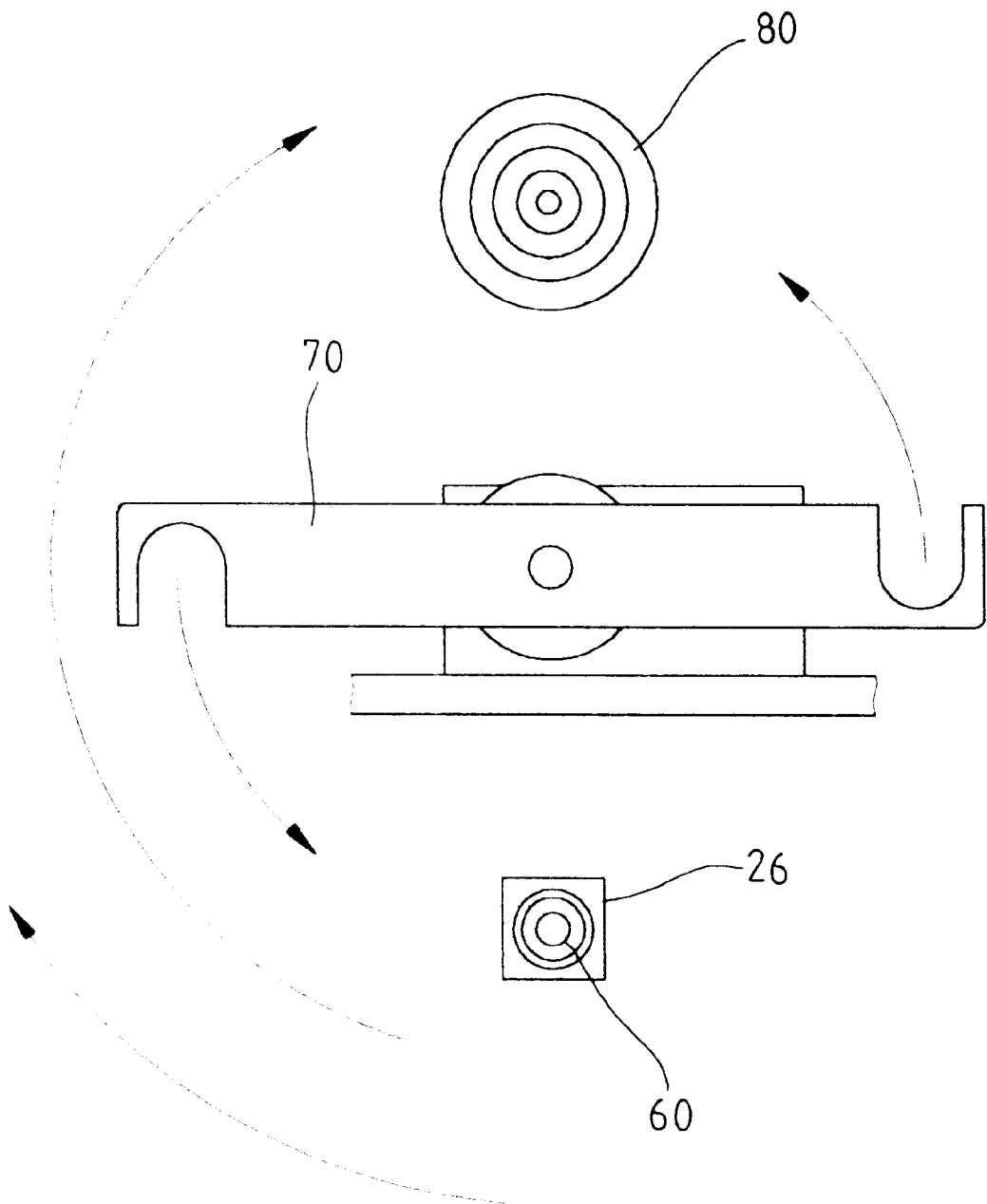
FIG. 7 is an illustrative view to shown the motion of the knife engaging means between the second cylinder and the driving shaft.
Figure 8:
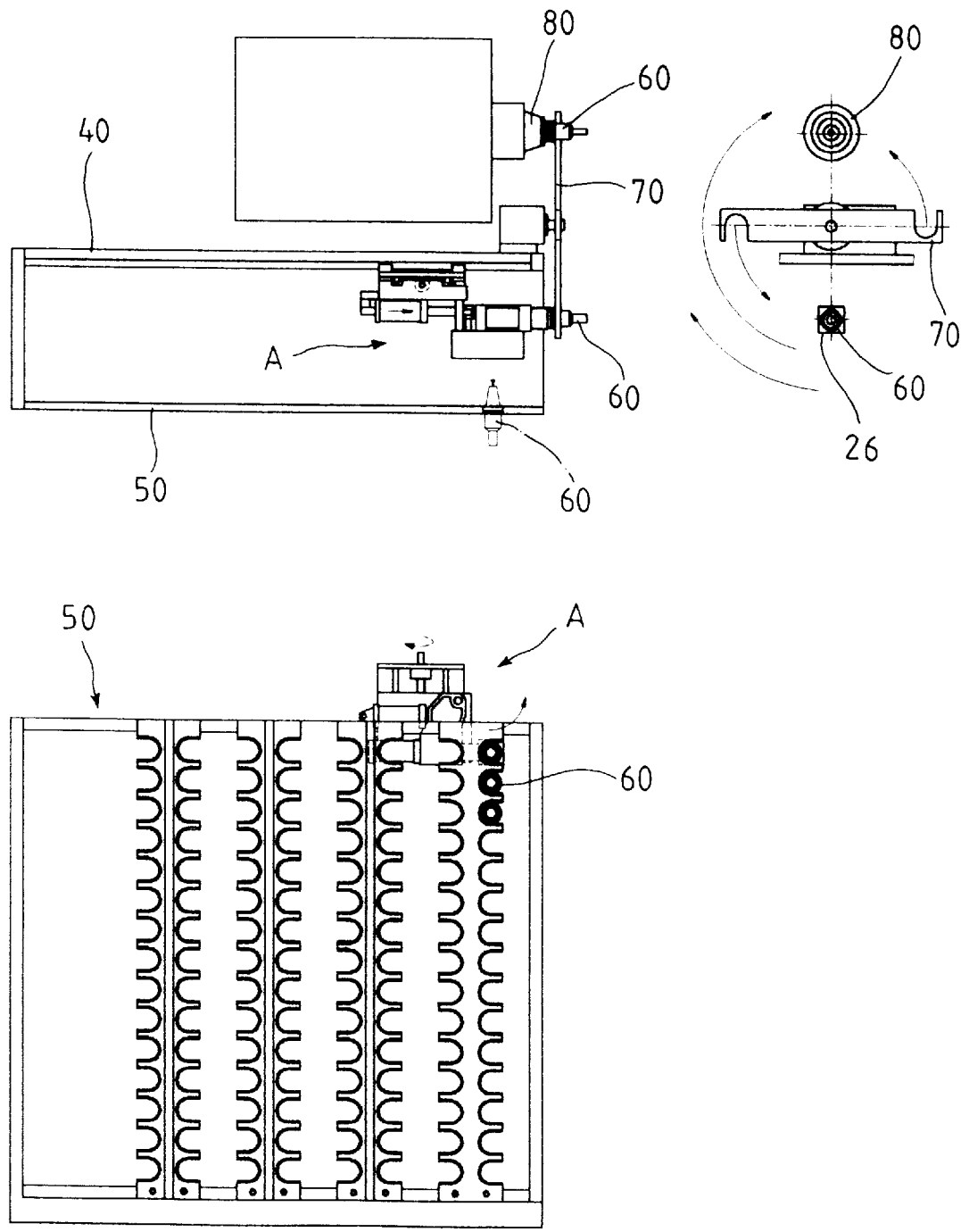
FIG. 8 is an illustrative view to shown the knife picking device, the knife receiving unit and the knife engaging means in three directions.

As shown in FIG. 6, the second piston rod is then retracted and then the third cylinder 35 is actuated to let the third piston rod 351 extend. The motion of the third piston rod 351 pivots the arm 36 about the pin 362 so that the base member 30 is pivoted about the main pin 39. The first piston rod 151 is then retracted to let the cylindrical member 22 and the second cylinder 26 rotate. In the meanwhile, as shown in FIGS. 7 and 8, a knife engaging plate 70 is engaged with two different knifes respectively on the second piston rod and the driving shaft 80. The clamping means on the driving shaft 80 and the clamping means (not shown) on the second piston rod are loosened so that when the knife engaging plate 70 rotates, the two knifes 60 are shifted and exchange their positions so that the knife 60 picked from the knife receiving unit 50 is placed to the driving shaft 80.

Figure 9:
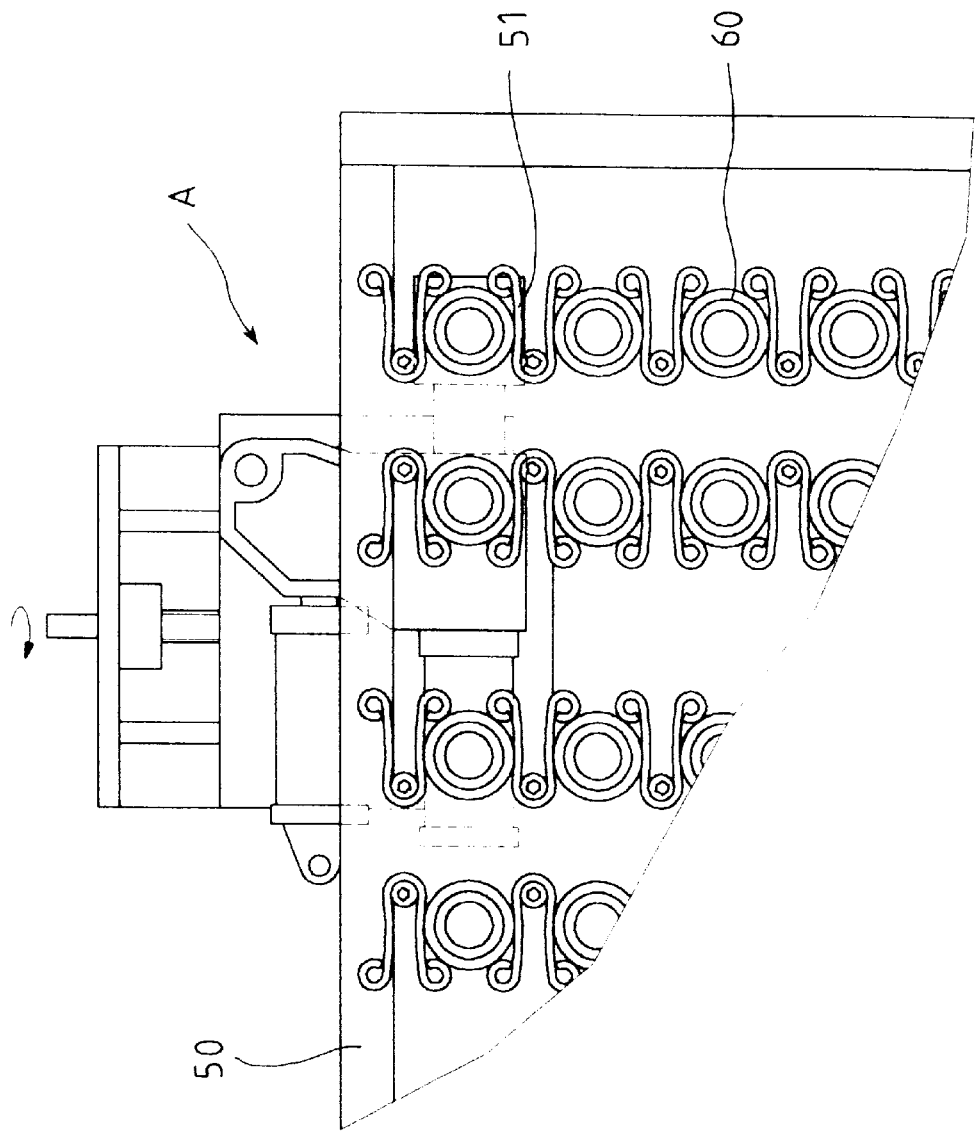
FIG. 9 is an enlarged view to show the knifes received in the knife receiving unit and the knife picking device.
Figure 10:
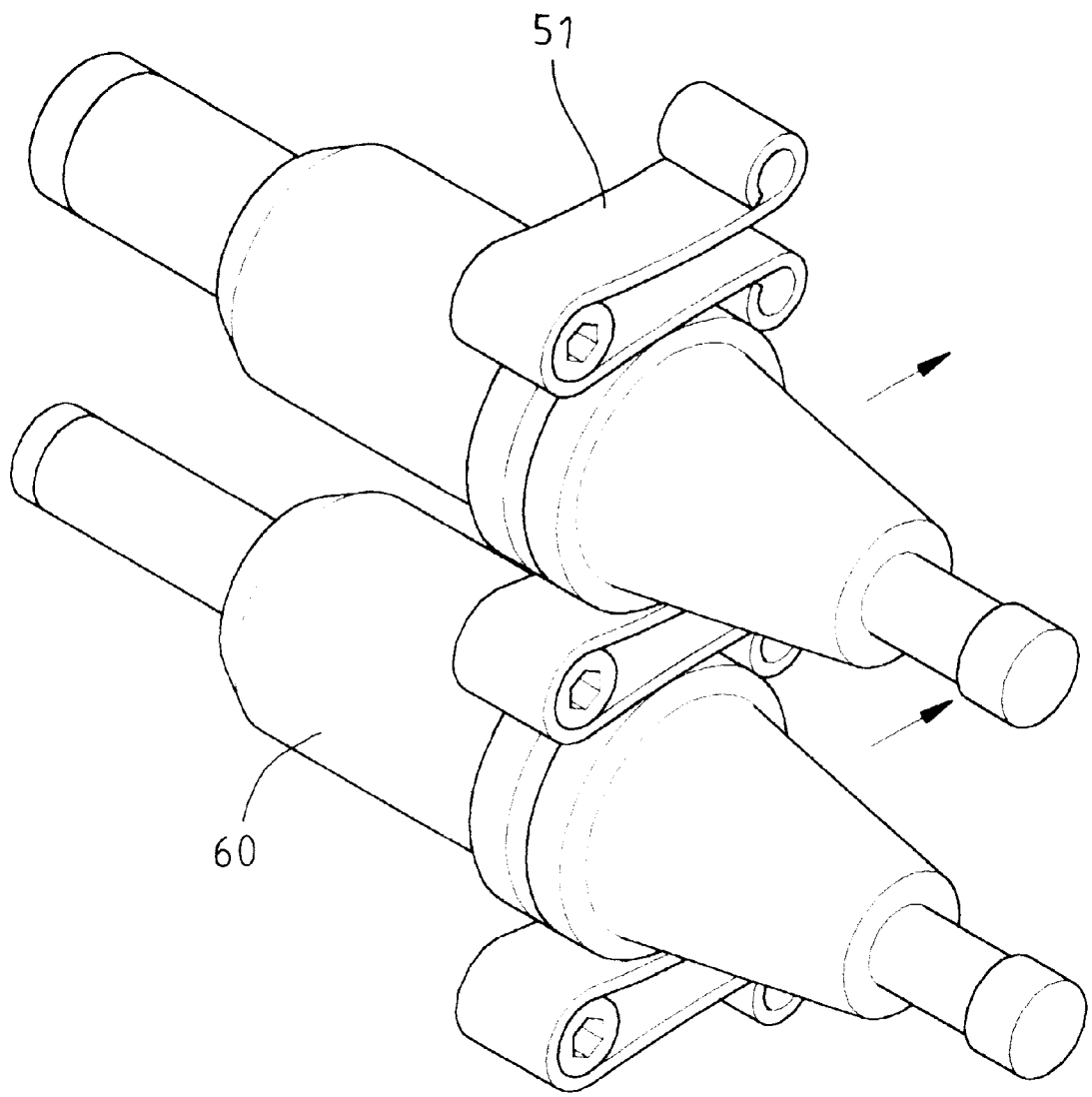

Referring to FIGS. 9 and 10, the knife receiving unit 50 includes a plurality of biasing members 51, each biasing member 51 is a U-shaped member so as to clamp a knife 60 between the two U-shaped biasing members 51. The linear guide frame 30 and the base member 10 can be moved to the desired position of the knife receiving unit 50 by moving along the first ballscrew 42 and the second ballscrew 44. Therefore, the knifes 60 in the knife receiving unit 50 does not need to be moved so that the structure of the knife receiving unit 50 is simple and no power system required.

Figure 11:
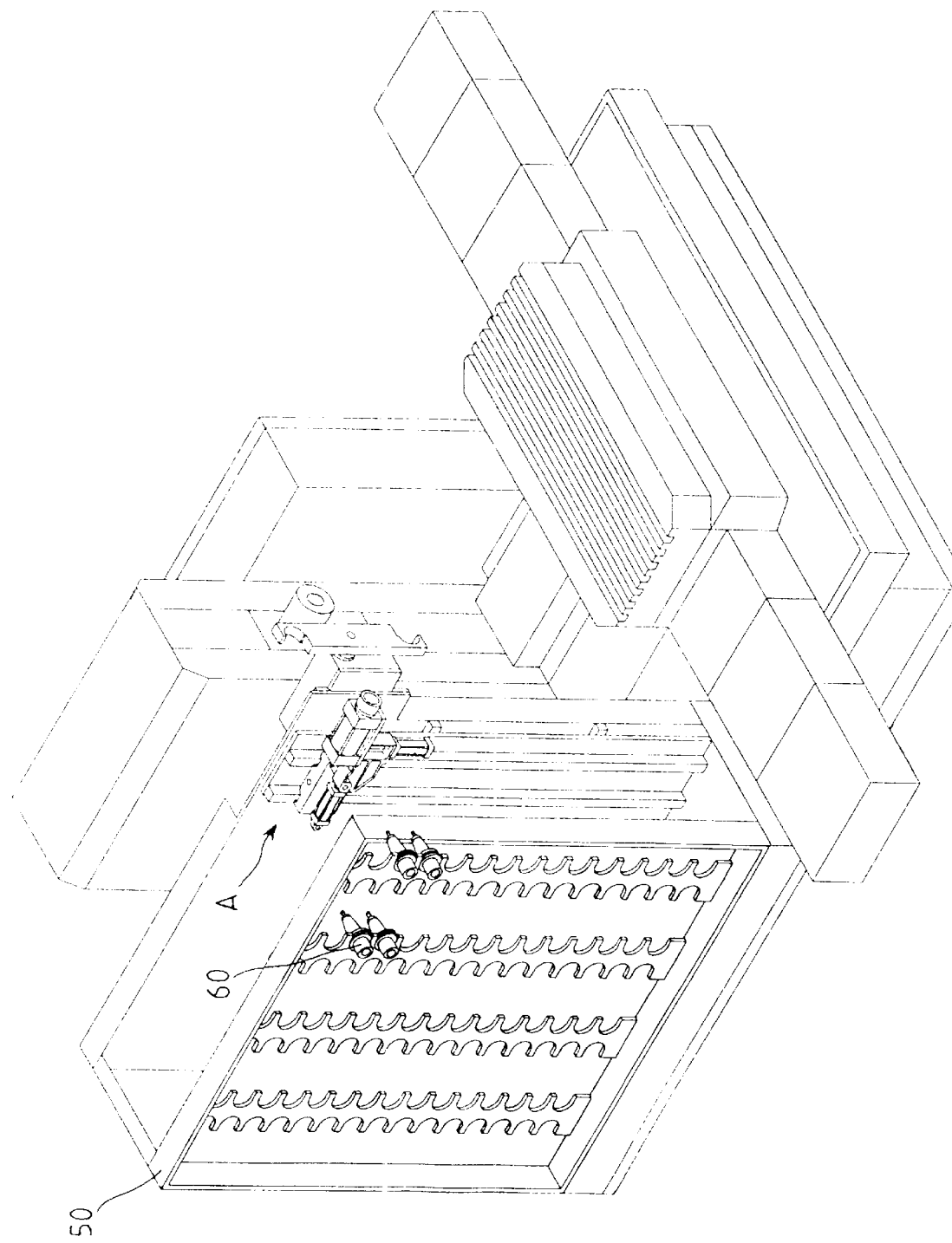
FIG. 11 is a perspective view to show the knife picking device and the knife receiving unit are cooperated with a horizontal cutting center machine.
Figure 12:
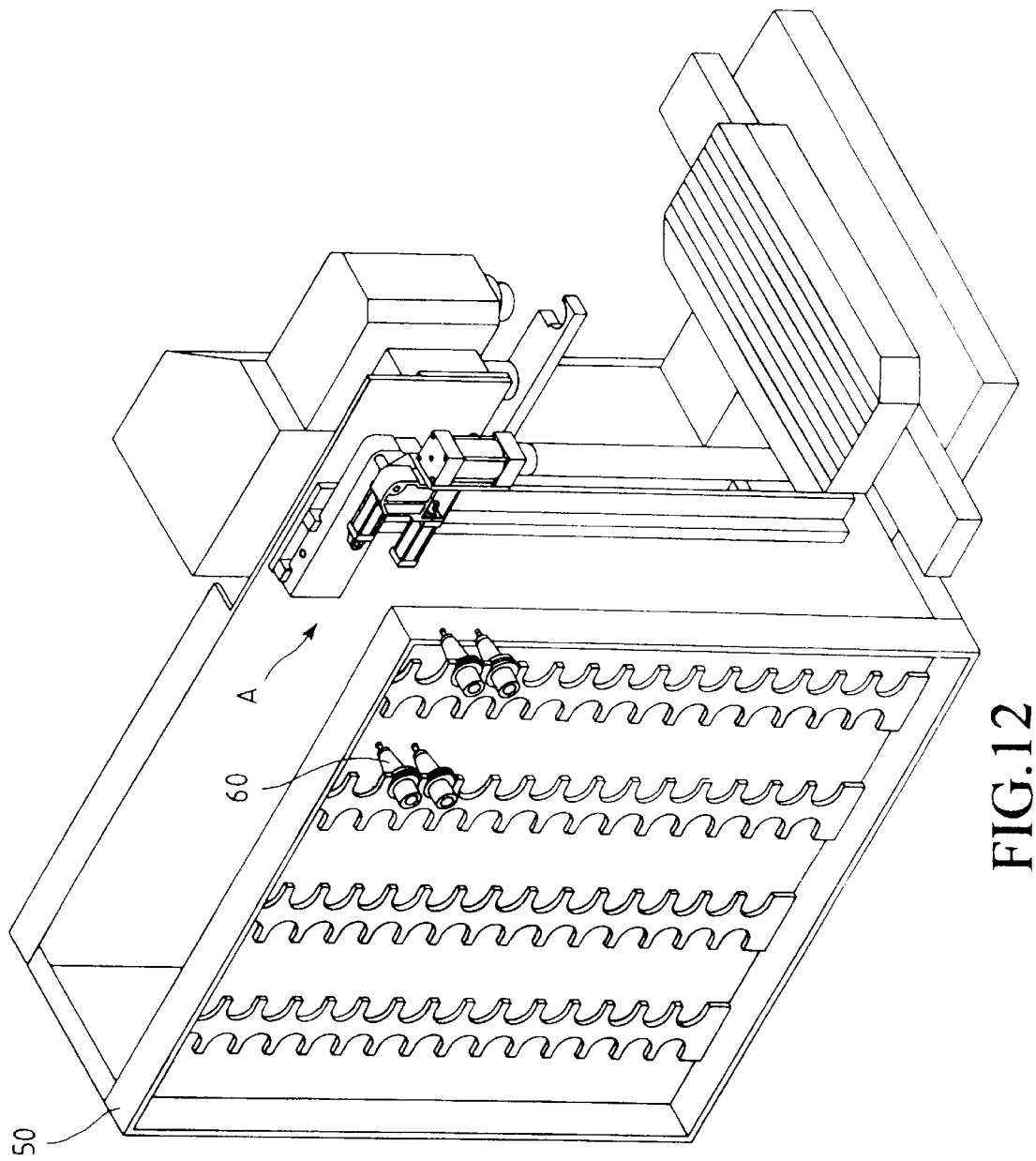
FIG. 12 is a perspective view to show the knife picking device and the knife receiving unit are cooperated with an upright cutting center machine.

FIG. 11 shows that the knife picking device "A" and the knife receiving unit 50 are cooperated with a horizontal cutting center machine, and FIG. 12 shows that the knife picking device "A" and the knife receiving unit 50 are cooperated with an upright cutting center machine.

While we have shown and described various embodiments in accordance with the present invention, it should be clear to those skilled in the art that further embodiments may be made without departing from the scope and spirit of the present invention.

What is claimed is:

1. A combination of a knife picking device and a knife receiving unit for a cutting center machine, said knife receiving unit located beside said knife picking device, said knife picking device comprising:

a linear guide board and a linear guide frame movably connected to said linear guide board;

a base member pivotally connected to said linear guide frame, said base member having a track, a pin having a first end thereof movably engaged with said track;

a block connected to said base member, a passage defined through said block and a slot defined radially through said block, said passage communicating with said slot, a cylindrical member movably and rotatably received in said passage of said block, said cylindrical member having a spiral groove defined in an outside thereof, a connection means engaged with said spiral groove and extending through said slot, a first cylinder having a first piston rod which is connected to said connection means, said cylindrical member having one end thereof connected to a second cylinder which has a second piston rod, and an arm having a first end thereof connected to a second end of said pin, a third cylinder having a third piston rod which is connected to said first end of said arm, said arm having a second end pivotally connected to said linear guide frame.

2. The combination as claimed in claim 1, wherein said track of said base member is composed of two parallel and inclined elongated members, said first end of said pin movably received between said two elongated members.

3. The combination as claimed in claim 1, wherein said block has a recess defined in a side thereof and said slot communicates with said recess, said connection means has a sliding member which is slidably received in said recess of said block.

4. The combination as claimed in claim 3, wherein said base member has a recessed area for receiving said side having recess of said block, an elongated notch defined in a bottom defining said recessed area, a pin extending through said sliding member, two ends of said pin respectively engaged with said spiral groove in said cylindrical member and said elongated notch in said base member.

5. The combination as claimed in claim 1 further comprising a main pin pivotally connected between said base member and said linear guide frame, said main pin located in opposite to said block.

6. The combination as claimed in claim 1 further comprising a sleeve connected to said linear guide frame and a first ballscrew threadedly extending through said sleeve, a ballscrew inter-connector connected to said first ballscrew and a second ballscrew extending through said ballscrew inter-connector, said second ballscrew perpendicular to said first ballscrew.

7. The combination as claimed in claim 1, wherein said knife receiving unit includes a plurality of biasing members, each biasing member being a U-shaped member so as to be adapted to clamp a knife between said two U-shaped biasing members.

* * * * *